United States Patent [19]

Sumida et al.

[11] Patent Number: 5,647,550
[45] Date of Patent: *Jul. 15, 1997

[54] TAPE CARTRIDGE REEL LOCK MECHANISM

[75] Inventors: Takashi Sumida, Shiga-ken; Nobutaka Miyazaki, Otokuni-gun, both of Japan

[73] Assignee: Hitachi Maxell, Ltd., Osaka, Japan

[*] Notice: The term of this patent shall not extend beyond the expiration date of Pat. No. 5,451,007.

[21] Appl. No.: 565,275

[22] Filed: Nov. 30, 1995

Related U.S. Application Data

[60] Continuation of Ser. No. 435,139, May 5, 1995, abandoned, which is a division of Ser. No. 68,160, May 28, 1993, Pat. No. 5,451,007.

[30] Foreign Application Priority Data

Aug. 7, 1992 [JP] Japan ................................. 4-233022
Dec. 17, 1992 [JP] Japan ................................. 4-355840

[51] Int. Cl.$^6$ ................................. G11B 23/087
[52] U.S. Cl. ................................. 242/343.2
[58] Field of Search ................................. 242/338.1, 338.2, 242/338.3, 343, 343.1, 343.2; 360/132

[56] References Cited

U.S. PATENT DOCUMENTS

| | | |
|---|---|---|
| 4,660,784 | 4/1987 | Sumida et al. |
| 4,728,056 | 3/1988 | Onmori et al. |
| 4,742,418 | 5/1988 | Tanaka et al. |
| 4,789,113 | 12/1988 | Katagiri et al. |
| 4,862,305 | 8/1989 | Katagiri et al. |
| 4,969,611 | 11/1990 | Katagiri et al. ............... 360/132 |
| 5,091,813 | 2/1992 | Ryu ............................. 360/132 |
| 5,143,317 | 9/1992 | Sugiyama. |
| 5,210,670 | 5/1993 | Tanaka et al. |
| 5,451,007 | 9/1995 | Sumida et al. ............... 242/343.2 |

FOREIGN PATENT DOCUMENTS

59-203284  11/1984  Japan.

*Primary Examiner*—John P. Darling
*Attorney, Agent, or Firm*—Birch Stewart Kolasch & Birch, LLP

[57] ABSTRACT

A magnetic tape cartridge, particularly for use in a digital audio tape player, which includes a lock mechanism for avoiding an arbitrary motion of any one of the reels within the cartridge so as to avoid an undesirable loosening of a length of the magnetic tape extending between the reels, The lock mechanism including a lock member normally biased to a lock position and having lock pawls normally engaged with toothed lock wheels integral with the respective reels, at least one stopper rod protruding from one end of the lock member and terminating in alignment with a free end of a corresponding one of hinge arms integral with a front cover used to selectively open and close a front opening of the cartridge such that so long as the front cover is in position to close the front opening, the free end of the stopper rod is positioned in close proximity to the corresponding hinge arm to keep the lock member immovable even when a drastic impact acts on the tape cartridge tending the lock member to move from the locked position towards an unlocked position.

14 Claims, 12 Drawing Sheets

TAPE CARTRIDGE REEL LOCK MECHANISM

This application is a continuation of application Ser. No. 08/435,139 filed on May 5, 1995, now abandoned, which is a divisional of application Ser. No. 08/068,160, filed on May 28, 1993, now U.S. Pat. No. 5,451,007 the entire contents of which are hereby incorporated by reference.

BACKGROUND OF THE INVENTION

1. Field of the Invention

The present invention relates to a tape cartridge accommodating a rolled length of magnetic recording tape and, more particularly, to a tape cartridge having a reel lock mechanism to keep reels immovable when the tape cartridge is not in use.

2. Description of the Related Art

DAT tape cartridges, that is, tape cartridges specifically designed for use with a digital audio tape (DAT) player, are generally provided with a reel lock mechanism to keep reels immovable when the tape cartridge is not in use. This type of reel lock mechanism is disclosed in, for example, Japanese Laid-open Utility Model Publication No. 63-191483, published in 1988, and this known reel lock mechanism will now be discussed with the aid of FIGS. 20a and 20b of the drawings annexed hereto.

Figure 20A:
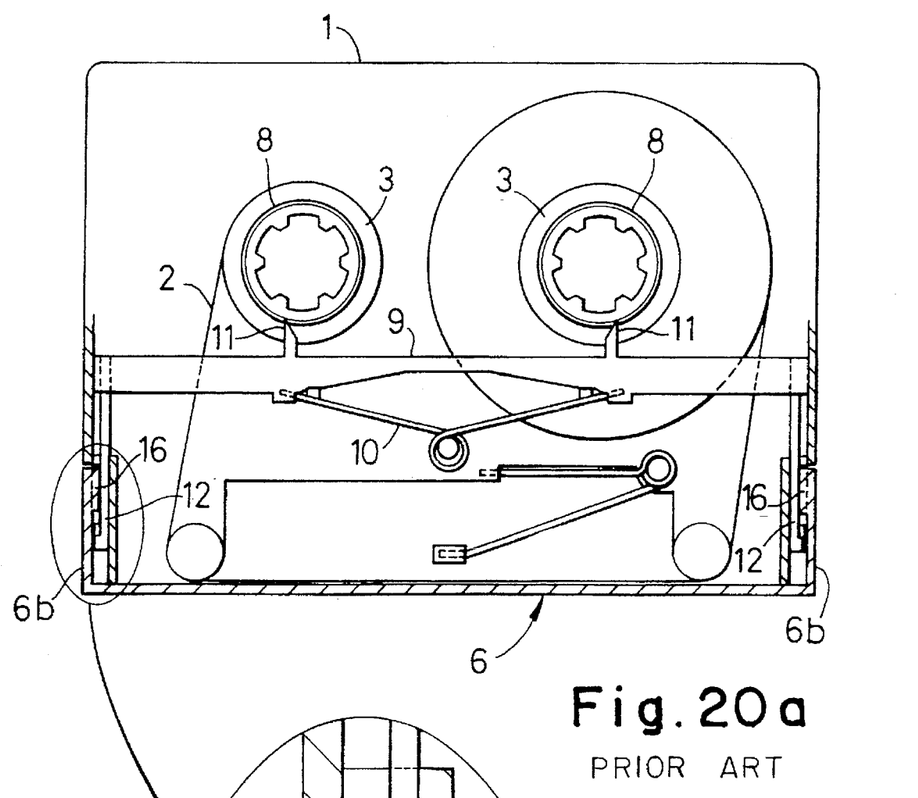
FIG. 20(a) is a top plan view, with the top wall removed, of a tape cartridge of the prior art.

As is well known, the tape cartridge of the type to which the present invention pertains is generally standardized in size and configuration so that it can be used with the commercially available digital audio tape player. This tape cartridge comprises a generally rectangular box-like casing 1 including rectangular top and bottom walls and a peripheral wall disposed between the top and bottom walls to keep the top and bottom walls spaced apart a distance enough to accommodate a length of magnetic recording tape within the casing, the peripheral wall including a hingedly supported front wall section or front cover 6, a rear wall section opposite to the front cover and a pair of side wall sections, all assembled together with the top and bottom walls to render the cartridge to represent a generally rectangular, generally flattened box-like configuration.

In practice, the casing 1 is divided into two casing halves along a plane generally intermediate of the thickness of the peripheral wall.

Within the casing 1, there is disposed a pair of freely rotatable reels 3, each generally in the form of a cylindrical hub, to which opposite ends of the length of magnetic recording tape 2 are anchored respectively, and a pair of guide rollers 5 rotatably disposed within the casing 1 at respective corner areas adjacent the front cover 6 so as to permit a portion of the length of magnetic recording tape 2 between the guide rollers 5 to extend generally parallel to the front cover 6.

Figure 20B:
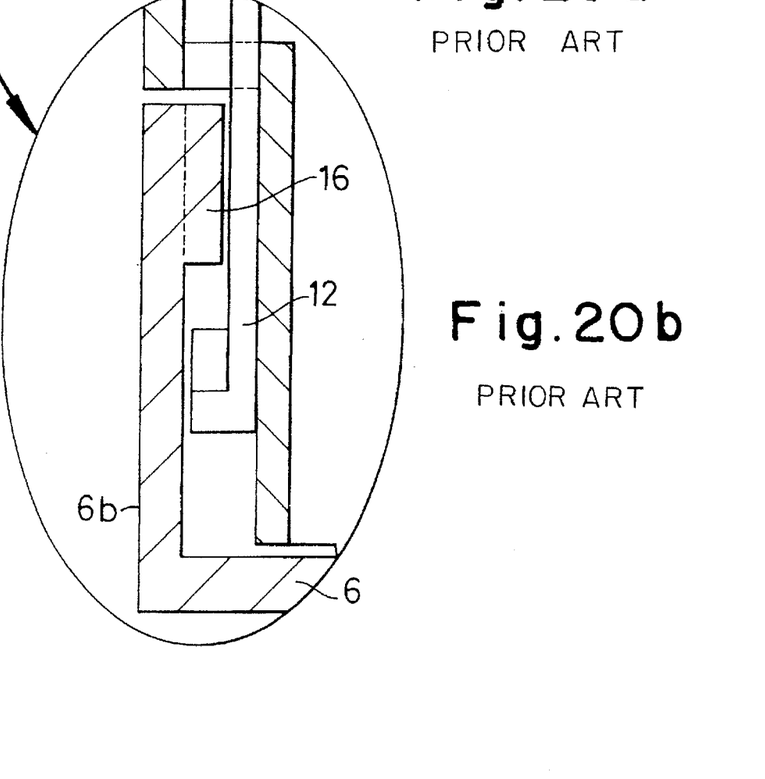
FIG. 20(b) is a fragmentary to sectional enlarged view of that portion of the tape cartridge enclosed in the circle of FIG. 20 (a).

As shown in FIGS. 20a and 20b, the reel lock mechanism employed in the prior art DAT tape cartridge is housed within the casing 1 and is cooperable with any one of toothed lock wheels 8 each formed integrally with one end of the associated reel 3. This reel lock mechanism includes a generally elongated, thin-walled lock member 9 extending widthwise of the casing 1 and between the opposite side wall sections of the casing 1 for movement between unlocked and locked positions in a direction perpendicular to the lengthwise direction of the lock member 9. The lock member 9 has lock pawls 11 formed integrally therewith so as to protrude outwardly therefrom for engagement with the corresponding toothed lock wheels 8 integral with the respective reels 3.

The lock member 9 is normally biased towards the lock position by a wire spring 10 and has its opposite ends connected or integrally formed with respective traction arms 12 extending perpendicular to the lock member 9. Respective free ends of the traction arms 12 are operatively associated with the front cover 6 so that, when the front cover 6 is opened to allow that portion of the length of magnetic recording tape 2 to be exposed to the outside, the lock member 9 can be retraced against the resiliency of the wire spring 10 towards the unlock position with the lock pawls 11 consequently disengaging from the associated toothed lock wheels 8, but when the front cover 6 is closed to conceal that portion of the length of magnetic recording tape 2, the lock member 9 can be urged by the wire spring 10 to the lock position with the lock pawls 11 consequently engaged with the toothed lock wheels 8.

To operatively couple the free ends of the front cover 6, respective hinge arms 6b protruding transversely from opposite ends of the front cover 6 have their inner surfaces formed with associated operating ribs 16. So long as the lock member 9 is held in the lock position, the lock pawls 11 are engaged with the associated toothed lock wheels 8 integral with the reels 3 and, therefore, the reels 3 are held immovable to avoid any possible loosening of the length of magnetic recording tape 2.

With the reel lock mechanism wherein the biasing force of the wire spring 10 is utilized to keep the lock member 9 in the lock position, the lock pawls 11 integral with the lock member 9 will not disengage from the associated toothed lock wheels 8 so long as the tape cartridge is handled normally. However, when an excessive external force such as an impact on the tape cartridge as a result of, for example, an accidental fall of the tape cartridge onto an indoor or outdoor ground surface, the reels 3 may be instantaneously rattled enough to cause the lock member 9 to be undesirably displaced against the resiliency of the wire spring 10. Once this occur, the lock pawls 11 are disengaged from the associated toothed lock wheels 8, permitting the reels 3 to rotate idle, resulting in a loosening of the length of magnetic recording tape 2 that is turned around those reels 3.

When the tape cartridge in which the length of magnetic recording tape 2 has been loosened in the manner described above is loaded into a digital audio tape player, the length of magnetic recording tape may be undesirably bent and/or caught by loading pins employed in the digital audio tape player to pull that portion of the length of magnetic recording tape outwardly from the casing, eventually resulting in a detrimental problem in that the tape cartridge may be no longer usable and/or a tape loading mechanism in the digital audio tape player may be impaired.

SUMMARY OF THE INVENTION

The present invention is therefore intended to provide an improved tape cartridge wherein, even though an external force such an impact acts on the tape cartridge, the lock member will not be undesirably displaced towards the unlock position unless the front cover is operated, thereby to avoid any possible undesirable loosening of the length of magnetic recording tape within the tape cartridge when the tape cartridge is not in use.

To this end, the present invention provides a tape cartridge which comprises a generally rectangular box-like casing including rectangular top and bottom walls, a pair of side walls and a rear wall, all assembled together to represent a generally rectangular flat box-like configuration with a tape chamber defined therein, and having a front opening defined therein so as to confront the rear wall. The casing also includes a front cover hinge supported having a pair of hinge arms pivotally coupled to the respective side walls for pivotal movement between an opened position, in which the front cover opens the front opening, and a closed position in which the front cover closes the front opening.

First and second reels are rotatably housed within the tape chamber, opposite ends of the length of magnetic tape being secured to the first and second reels, respectively. Each reel has a toothed lock wheel rotatable together therewith.

The tape cartridge also comprises a hub lock mechanism housed within the tape chamber and including a generally elongated lock member movable between locked and unlocked positions in a direction transverse to the front cover, and a spring element for biasing the lock member towards the locked position. The lock member has lock pawls engageable with the toothed lock wheels to lock the respective reels when the lock member is in the lock position and also has traction arms protruding from opposite ends of the lock member in a direction perpendicular to the lock member and towards the hinge arms, the traction arms being operatively coupled with the hinge arms such that, as the front cover is pivoted from the closed position towards the opened position, the lock member is pulled from the lock position towards the unlock position against the spring element.

The tape cartridge further comprises at least one stopper rod protruding from a corresponding one of the opposite ends of the lock member in a direction perpendicular to the lock member and towards the front opening in alignment with a corresponding one of the hinge arms, the stopper rod having a free end positioned in close proximity of a free end of the corresponding hinge arm, when the front cover is in the closed position thereby to keep the lock member immovable.

A lateral displacement suppressing means may be employed in the tape cartridge of the present invention. This lateral displacement suppressing means may be defined in part in the free end of the stopper rod and in part in the free end of the corresponding hinge arm for avoiding a deformation of stopper rod inwardly of the casing.

Preferably, the lateral displacement suppressing means may comprise a first lateral engagement defined in the free end of the stopper rod and a second lateral engagement defined in the free end of the corresponding hinge arms, the first and second lateral engagements being laterally offset in position relative to each other with respect to a longitudinal axis of any one of the stopper rod and the corresponding hinge arm.

Alternatively, the lateral displacement suppressing means may comprise a first inclined face defined at the free end of the stopper rod and a second inclined face defined at the free end of the corresponding hinge arm, the first and second inclined faces being complemental to each other and inclined relative to a longitudinal axis of any one of the stopper rod and the corresponding hinge arm.

Also alternatively, the lateral displacement suppressing means may comprise a protuberance protruding outwardly from one of the free ends of the stopper rod and the corresponding hinge arm and a pocket defined in the other of the free ends of the stopper rod and the corresponding hinge arm for receiving the protuberance therein.

Preferably, the casing may include an inner side wall segment for restricting an inward displacement of any one of the stopper rod and each hinge arm when the front cover is in the closed position.

Also preferably, the casing may include an outer side wall segment for restricting an outer displacement of any one of the stopper rod and each hinge arm when the front cover is in the closed position.

Again preferably, the tape cartridge may further comprise a generally U-sectioned slider forming a front area of the bottom-panel and supported for movement in a direction perpendicular to the front cover for selectively opening and closing a bottom region of the front opening, the slider having upright side wall elements aligned with the respective hinge arms integral with the front cover, each of the side wall elements having a first engagement defined therein while each of the hinge arms has a second engagement defined therein for engagement with the first engagement to prevent the hinge arms from being outwardly deformed.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE INVENTION

Referring now to FIGS. 1, 2, 4 and 5 showing a first preferred embodiment of the present invention, the tape cartridge shown therein is so designed and so structured as to meet the DAT standards so that it can be used with the commercially available digital audio tape player of any make. This tape cartridge comprises a generally rectangular box-like casing 1. The casing 1 includes rectangular top and bottom walls and a peripheral wall disposed between the top and bottom walls to keep the top and bottom walls spaced apart a distance enough to accommodate a length of magnetic recording tape 2 within the casing 1 and including a hinge supported front wall section or front cover 6, a rear wall section opposite to the front cover and a pair of side wall sections, all assembled together with the top and bottom walls to render the cartridge to represent a generally rectangular, generally flattened box-like configuration.

Figure 1:
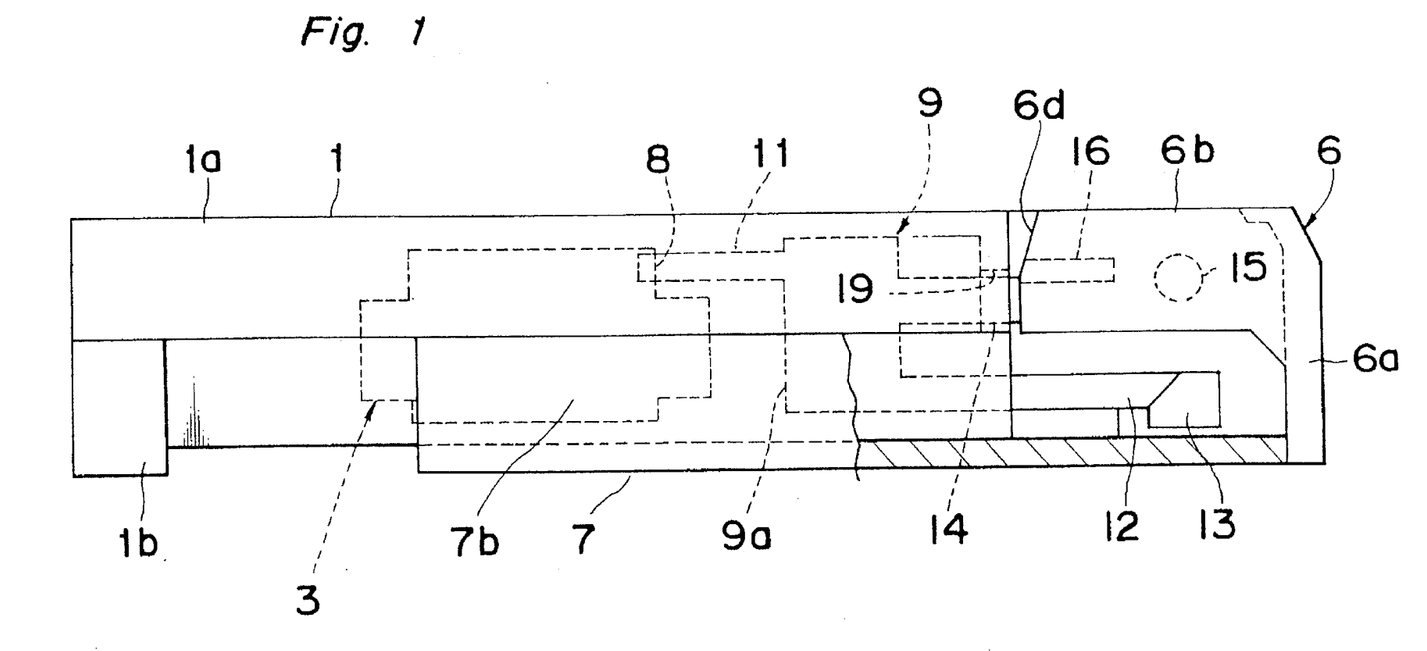
FIG. 1 is a side view, with a portion broken, of a tape cartridge according to a first preferred embodiment of the present invention.
Figure 2:
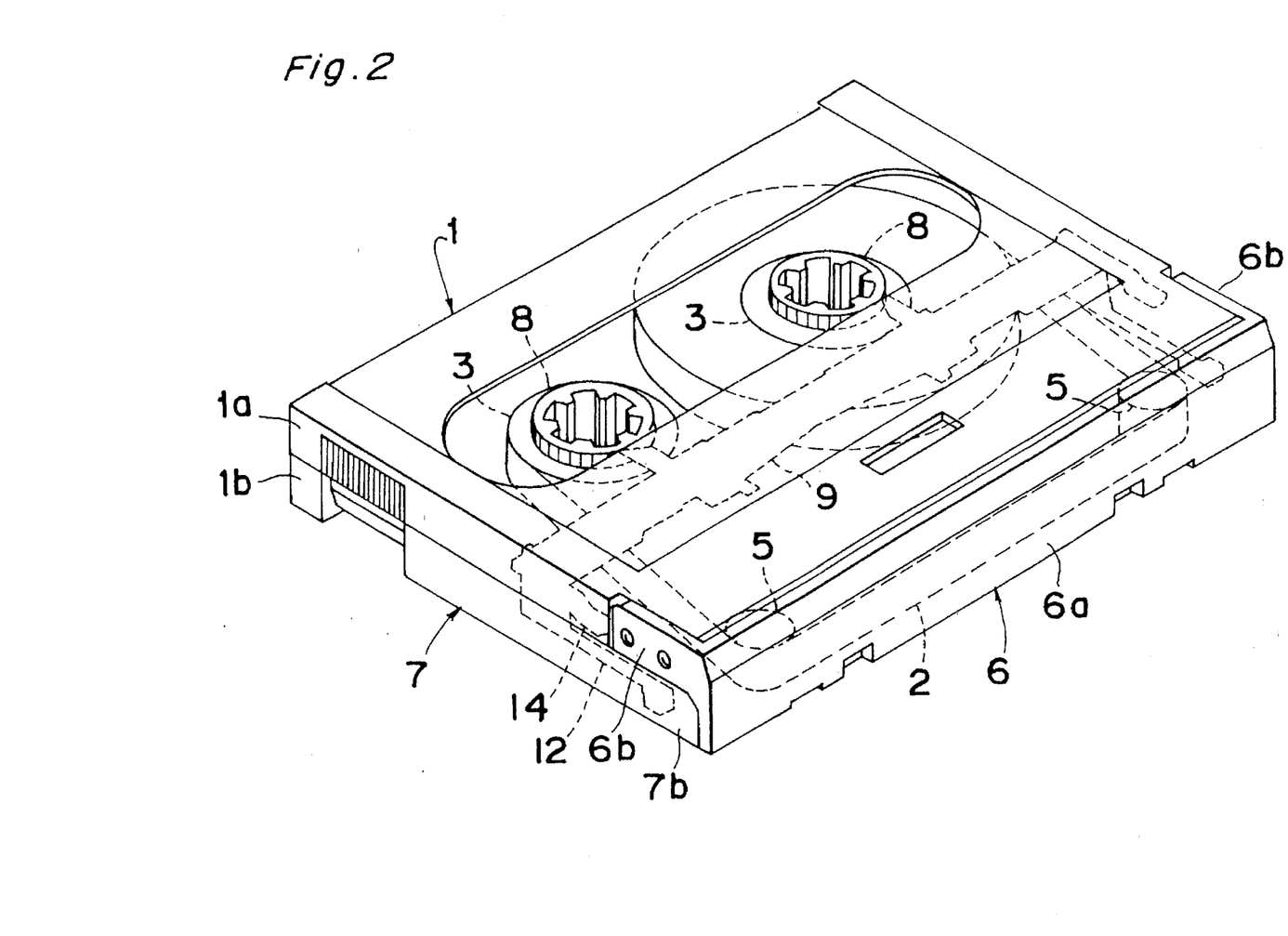
FIG. 2 is a perspective view of the tape cartridge according to the first preferred embodiment of the present invention.

In practice, the casing 1 is comprised of upper and lower casing halves 1a and 1b separate from each other along a plane generally intermediate of the thickness of the peripheral wall, which casing halves 1a and 1b are placed one above the other and then bonded or rigidly connected together to complete the casing 1.

Within the casing 1, there is disposed a pair of freely rotatable reels 3, each generally in the form of a cylindrical hub, to which opposite ends of the length of magnetic recording tape 2 are anchored respectively, and a pair of guide rollers 5 rotatably disposed within the casing 1 at respective corner areas adjacent the front cover 6 so as to permit a portion of the length of magnetic recording tape 2 between the guide rollers 5 to extend generally parallel to a plane of a transverse front window 4 adapted to be selectively opened and closed by the front cover 6. In practice, the length of magnetic recording tape 2 when the tape cassette is in use within the digital audio player travels from one reel 3 to the other reel 3 via the guide rollers 5 with that portion of the magnetic recording tape 2 pulled outwardly through the transverse front window 4 for sliding engagement with a magnetic recording and/or reproducing head. At this time the front cover 6 is held in an open position to permit that portion of the length of magnetic recording tape 2 to be pulled outwardly through the transverse front window 4.

The front cover 6 includes a generally elongated front flap 6a extending a distance sufficient to close the entire width of the front window 4 and hinge arms 6b secured to, or otherwise formed integrally with, respective opposite ends of the front cover 6 so as to protrude transversely therefrom. Free ends of the hinge arms 6b remote from the front flap 6a are pivotally connected to the side wall sections of the casing 1 by means of associated pivot pins 15 so that the front cover 6 can pivot about a common axis of the pivot pins 15 between a closed position, in which the front window 4 is closed to protect that portion of the length of magnetic recording tape, and an opened position in which that portion of the length of magnetic recording tape 2 is exposed to the outside through the front window 4. It is, however, to be noted that the front cover 6 is normally biased by a spring element (not shown) so as to assume the closed position.

The tape cartridge carries a slider 7 which forms a front part of the bottom wall thereof adjacent the transverse front window 4 and which is supported for movement in a direction perpendicular to the widthwise direction of the casing 1 for selectively opening and closing a bottom region of the transverse front window 4. This slider 7 is normally biased by a biasing spring 17 towards a projected position to close the bottom region of the transverse front window 4.

Figure 3A:
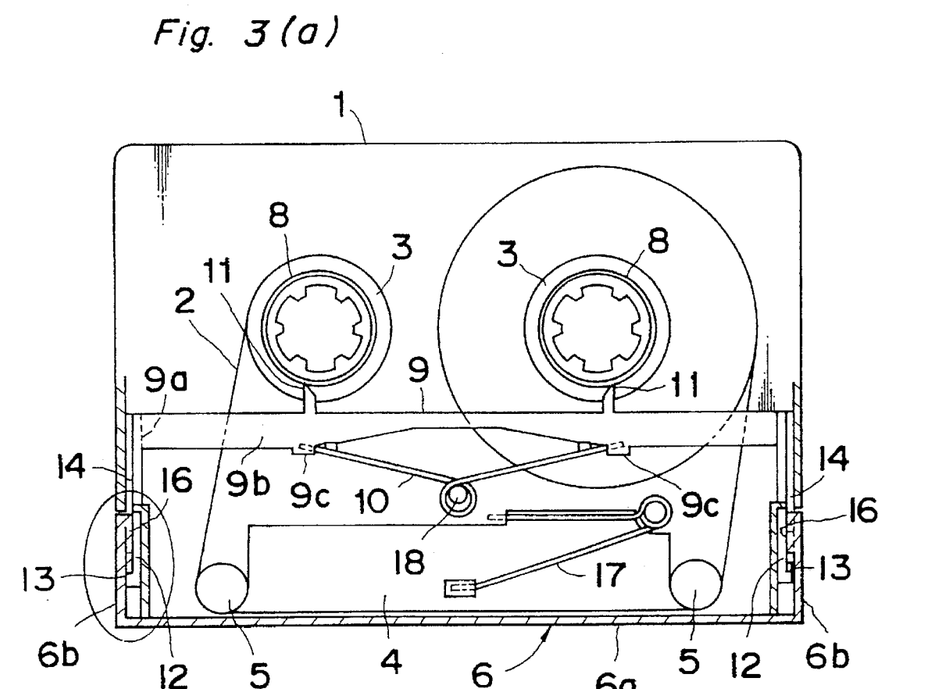
FIG. 3(a) is a top plan view, with the top wall removed, of the tape cartridge of FIG. 1 showing interior component parts thereof.

A reel lock mechanism operable to avoid an arbitrary rotation of any one of the reels 3 within the casing 1 when the tape cartridge is not in use is housed within the casing 1 and cooperates with any one of toothed lock wheels 8 each formed integrally with one end of the associated reel 3.

This reel lock mechanism includes a generally elongated, thin-walled lock member 9 extending widthwise of the casing 1 and between the opposite side wall sections of the casing 1 for movement between unlocked and locked positions in a direction perpendicular to the lengthwise direction of the lock member 9. The lock member 9 has lock pawls 11 formed integrally therewith so as to protrude outwardly therefrom for engagement with the corresponding toothed lock wheels 8 integral with the respective reels 3.

The lock member 9 is normally biased towards the lock position by a wire spring 10 and has its opposite ends connected or integrally formed with respective traction arms 12 extending perpendicular to the lock member 9. Respective free ends of the traction arms 12 are operatively associated with the front cover 6 so that, when the front cover 6 is opened to allow that portion of the length of magnetic recording tape 2 to be exposed to the outside, the lock member 9 can be retraced against the resiliency of the wire spring 10 towards the unlocked position with the lock pawls 11 consequently disengaged from the associated toothed lock wheels 8, but when the front cover 6 is closed to conceal that portion of the length of magnetic recording tape 2, the lock member 9 can be urged by the wire spring 10 to the lock position with the lock pawls 11 consequently engaged with the toothed lock wheels 8.

Figure 4:
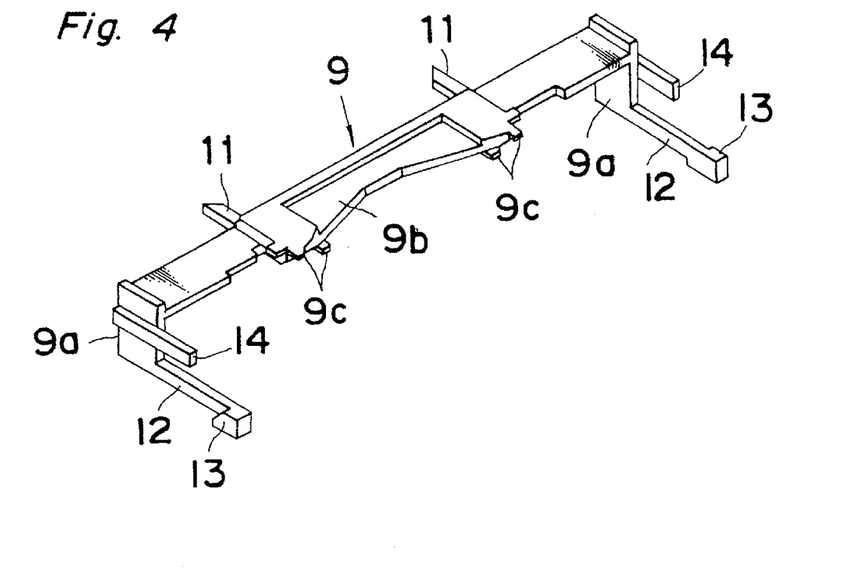
FIG. 4 is a perspective view showing a reel lock mechanism employed in the tape cartridge according to the first preferred embodiment of the present invention.

As best shown in FIG. 4, the lock member 9 is made of plastic by the use of a plastic molding techniques and is therefore of one-piece construction including side plates 9a and a generally elongated, thin-walled bridge plate 9b extending between the side plates 9a, lock pawls 11 positioned generally intermediate of the length of the bridge plate 9b and protruding laterally outwardly therefrom so as to confront the associated toothed lock wheels 8, and traction arms 12 protruding from the respective side plates 9a in a direction counter to the direction of extension of the lock pawls 11 and positioned offset relative to the bridge plate 9b. Respective free ends of the traction arms 12 are formed integrally with engagement pawls 13 protruding laterally outwardly in respective directions opposite to each other.

The lock member 9 also includes stopper rods 14 secured to the respective side plates 9a at a location intermediate between the bridge plate 9b and the traction arms 12 so as to protrude parallel to the associated traction arms 12 in a direction conforming to the direction of extension of the traction arms 12, but terminating a distance inwardly from the free ends of the traction arms 12. Since the lock member 9 is normally biased by the wire spring 10 towards the lock position as briefly described, the bridge plate 9b has a pair of fingers 9c formed therein at a location generally intermediate of the length of the bridge plate 9b so as to confront in a direction counter to the direction of extension of the lock pawls 11 for engagement with opposite ends of the wire spring 10 while the wire spring 10 having an intermediate eye defined therein is supported in position with the eye mounted on a support boss 18 integral with the top wall of the upper casing half 1a.

Figure 5:
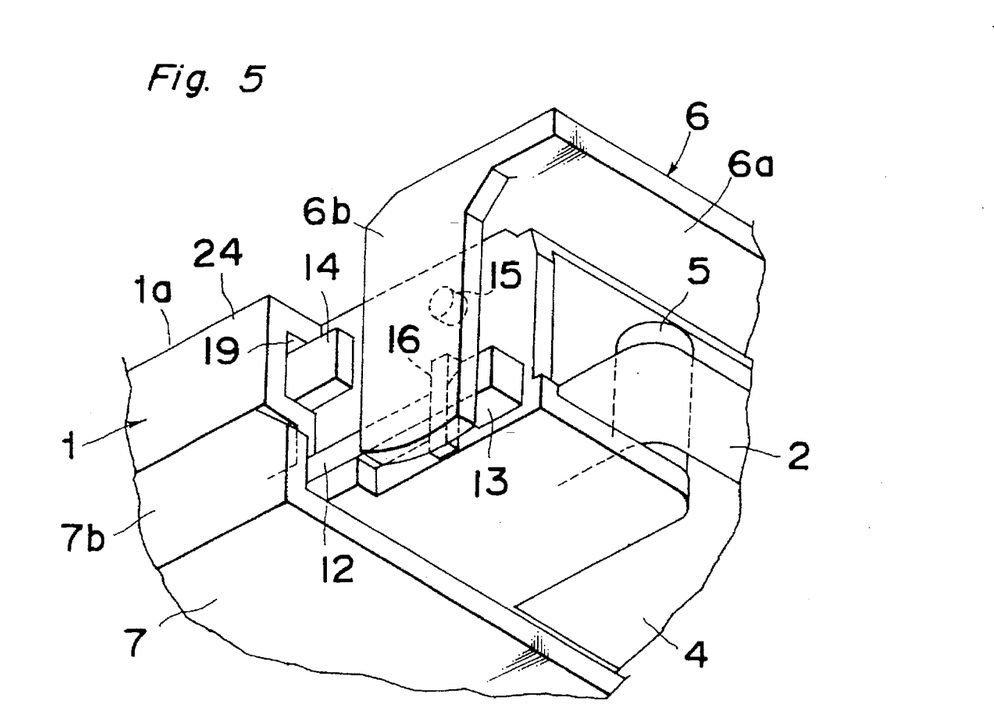
FIG. 5 is a fragmentary perspective view showing the details of one side corner of the tape cartridge according to the first preferred embodiment of the present invention.
Figure 6:
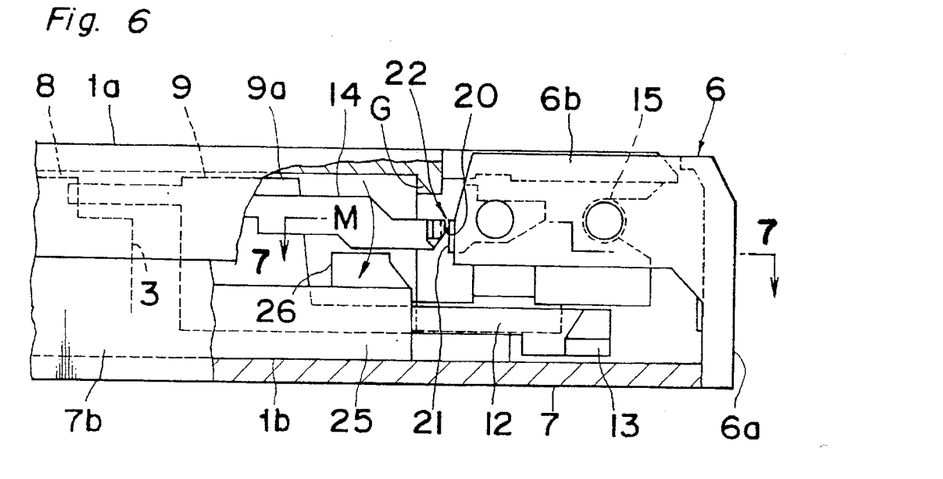
FIG. 6 is a fragmentary side view, with a portion cut away, of the tape cartridge according to a second preferred embodiment of the present invention.

As best shown in FIG. 5, to operatively couple the front cover 6 with the lock member 9, the hinge arms 6b of the front cover 6 which protrude transversely from opposite ends of the front cover 6 have their inner surfaces formed with associated operating ribs 16. So long as the lock member 9 is held in the lock position as biased by the wire spring 10, the lock pawls 11 are engaged with the associated toothed lock wheels 8 integral with the reels 3 to keep the reels 3 immovable thereby to avoid any possible loosening Of the length of magnetic recording tape 2 within the casing 1. At this time, the front cover 6 is held in the closed position, in which condition respective free end faces of the hinge arms 6b remote from the front flap 6a are held in contact with side walls 7b of the slider 7, as shown in FIG. 2. The condition shown in FIG. 2 illustrates when the tape cartridge is not in use.

Figure 3B:
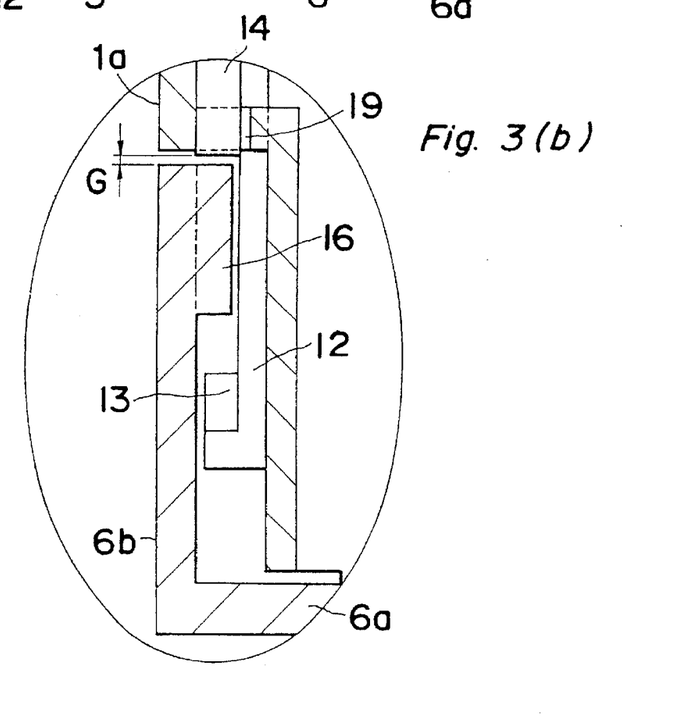
FIG. 3(b) is a fragmentary top sectional view, on an enlarged scale, of that portion of the tape cartridge which is enclosed in a circle shown in FIG. 3(a)

Referring still to FIG. 5, the stopper rods 14 secured to the respective side plates 9a of the lock member 9 have their free end portions exposed to the outside of the casing 1 through associated side openings 19 defined at stepped shoulders in opposite side walls of the upper casing half 1a. The stopper rods 14 are so sized and so configured that, when and so long as the lock member 9 is held in the lock position with the front cover 6 held in the closed position, respective free ends of the stopper rods 14 terminate at a location spaced a distance from the associated free end faces of the hinge arms 6b of the front cover 6 while forming a gap G therebetween, as best shown in FIG. 3(b). The gaps G between the free ends of the stopper rods 14 and the free end faces of the hinge arms 6b of the front cover 6 are secured for the purpose of permitting the front cover 6 to pivot from the closed position towards the opened position without receiving any resistance which would be imposed on the front cover 6 if a sliding contact took place therebetween. Care must, however, be taken that any movement of the lock member 9 integral with the stopper rods 14 over the distance corresponding to each gap G does not result in a disengagement of the lock pawls 11 from the associated toothed lock wheels 8 integral with the reels 3. This can be accomplished by choosing the size of each gap G to a value smaller than the depth of engagement of each lock pawl 11 into any one of the tooth grooves in the respective toothed lock wheel 8.

The provision of the stopper rods 14 in the lock member 9 as described hereinabove is effective to avoid an undesirable movement of the lock member 9 towards the unlock position while the front cover 6 is held in the closed position, that is, while the tape cartridge is not in use, because a corresponding movement of the stopper rods 14 is barred by the free end faces of the hinge arms 6b of the front cover 6 then held in the closed position. In other words, even though the lock member 9 tends to move towards the unlocked position against the resiliency of the wire spring 10 under the influence of an external force, such as impact acting on the tape cartridge as a result of, for example, a fall of the tape cartridge onto a ground surface, or even though an arbitrary motion of one or both of the reels 3, as a result of the application of the external force thereto, tends to cause the lock member 9 to move towards the unlock position, the movement of the lock member 9 over the distance which would result in the disengagement of the lock pawls 11 from the associated toothed lock wheels 8 is hampered by the engagement of the free ends of the stopper rods 14 against the free end faces of the hinge arms 6b of the front cover 6 then held in the closed position. Therefore, so long as the front cover 6 is held in the closed position, that is, the tape cartridge is not in use, the reels 3 can advantageously be locked in position with the lock pawls 11 engaged with the associated toothed lock wheels 8 integral with tie reels 3.

On the other hand, when the tape cartridge is in use, i.e., the tape cartridge is loaded in the digital audio tape player, the slider 7 is moved from the projected position, as shown in FIG. 1, towards the retracted position against the biasing spring 17, opening the bottom region of the transverse front window 4 and the front cover 6 is subsequently pivoted about the common axis of the pivot pins 15 from the closed position towards the opened position. As the front cover 6 so pivoted approaches the opened position, the operating ribs 16 are brought into abutment with the engagement pawls 13 and the continued pivot of the front cover 6 towards the opened position results in a pull of the traction arms 12 in a direction close towards the front window 4 and, therefore, the lock member 9 integral with the traction arms 12 is moved from the lock position towards the unlock position against the wire spring 10. It is to be noted that, since each of the free ends of the hinge arms 6b of the front cover is partially inclined or rounded, as shown by 6d in FIG. 1, so as to permit the free end of the associated stopper rod 14 to provide no obstruction to the passage of the free end of the corresponding hinge arm 6b, the pivotal movement of the front cover 6 from the closed position towards the opened position will not be hampered.

It may, however occur, that when the tape cartridge is inadvertently dropped onto the ground surface, one or both of the free ends of the stopper rods 14 may slide along the free end faces of the respective hinge arms 6b of the front cover 6 and then protrude into gaps each between the associated hinge arm 6b and the adjacent side wall section of the casing 1. Once this occurs, the free end portions of the hinge arms 6b may be undesirably deformed outwardly of the casing 1. This possibility can be advantageously eliminated according to a second preferred embodiment of the present invention which will now be described with particular reference to FIGS. 6 to 9.

According to the second preferred embodiment of the present invention, the tape cartridge is provided with means 22 for suppressing a lateral displacement of the free ends of the stopper rods 14 relative to the associated free ends of the hinge arms 6b. So far, as illustrated in FIGS. 6 to 9, this lateral displacement suppressing means 22 comprises a first lateral protuberance 20 formed on each of the free ends of the stopper rods 14 so as to protrude along an axis laterally offset from the longitudinal axis of the respective stopper rod 14, and a second lateral protuberance 21 formed on each of the free ends of the hinge arms 6b so as to protrude along an axis laterally offset from the longitudinal axis of the respective hinge arm 6b, but in a sense opposite to the axis along which the first lateral protuberance 20 protrudes.

Thus, it will readily be understood that, not only can the lateral displacement of the stopper rods 14 in a direction laterally inwardly of the casing 1 be blocked by the second lateral protuberances 21 then receiving the first lateral protuberances 20, but the lateral displacement of the hinge arms 6b integral with the front cover 6 in a direction laterally outwardly of the casing 1 can also be blocked by the lateral protuberances 20 then receiving the second lateral protuberances 21. Therefore, even though an intense impact acts on the tape cartridge, the possibility of one or both of the free ends of the stopper rods 14 plunging into the gaps each between the associated hinge arm 6b and the adjacent side wall section of the casing 1 can advantageously be minimized.

Figure 7:
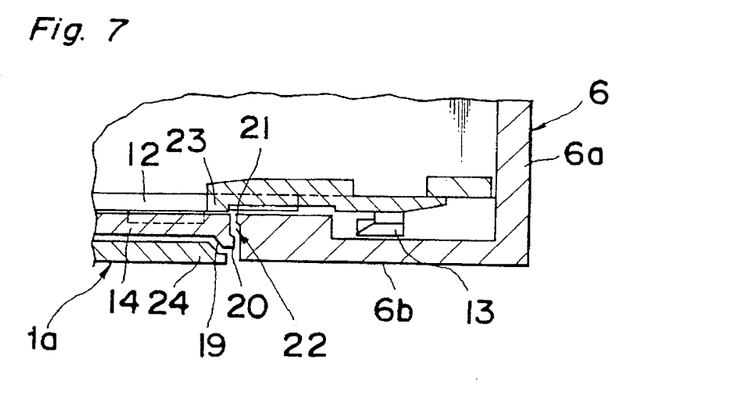
FIG. 7 is a cross-sectional view taken along the line A—A in FIG. 6.
Figures 8A, 8B:
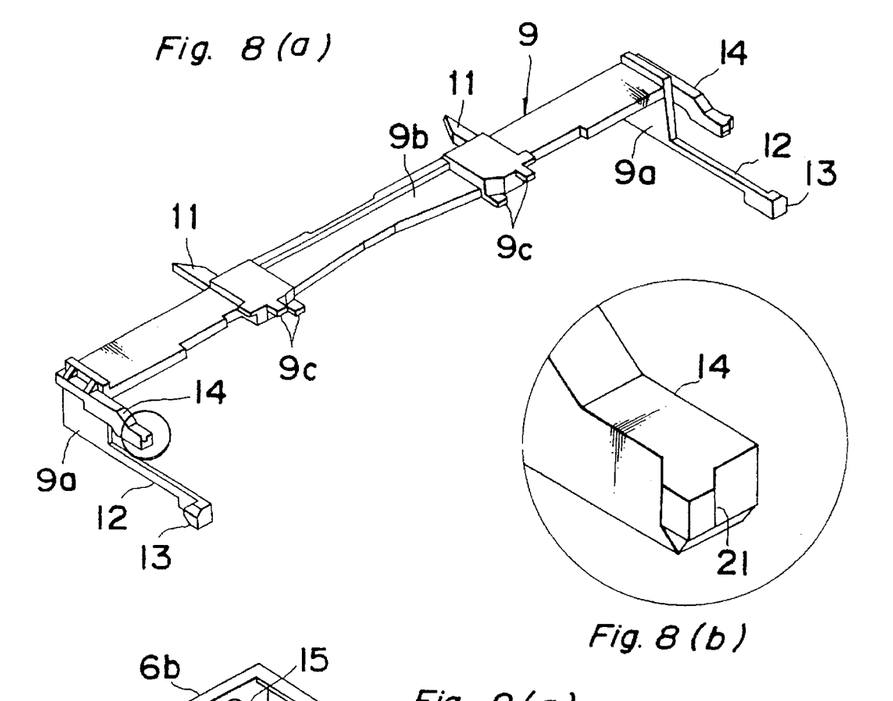
FIG. 8(a) is a perspective view of the reel lock mechanism employed in the tape cartridge according to the second preferred embodiment of the present invention.
FIG. 8(b) is a fragmentary top sectional view, on an enlarged scale, of that portion of the tape cartridge which is enclosed in a circle shown in FIG. 8(a)
Figures 9A, 9B:
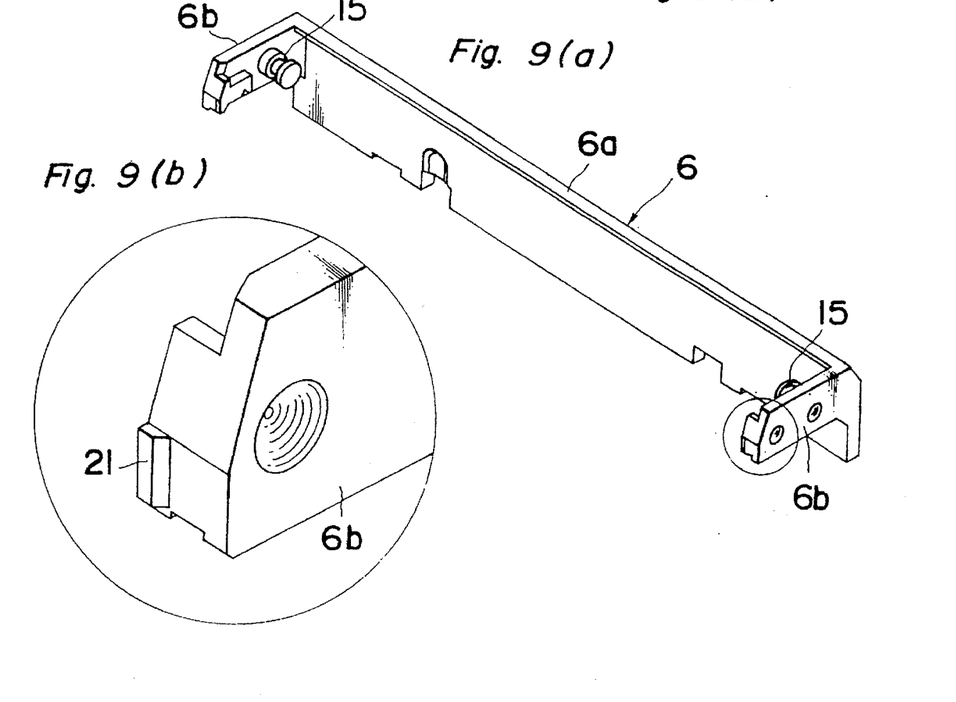
FIG. 9(a) is a perspective view of a front cover employed in the tape cartridge according to the second preferred embodiment of the present invention.
FIG. 9(b) is a fragmentary top sectional view, on an enlarged scale, of that portion of the tape cartridge which is enclosed in a circle shown in FIG. 9(a)
Figure 10:
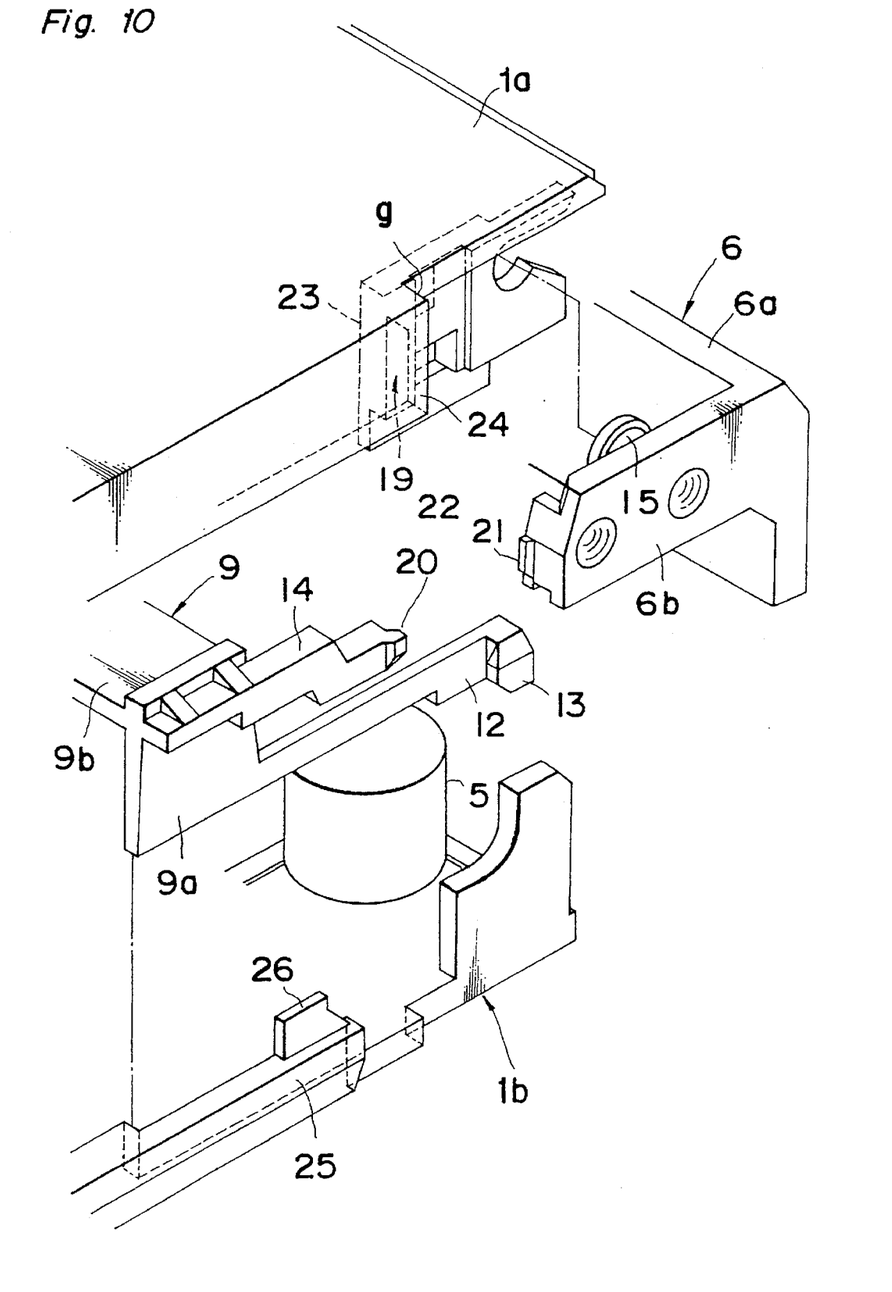
FIG. 10 is an exploded view, on an enlarged scale, showing the details of one of front corners of the tape cartridge according to the second preferred embodiment of the present invention.

Each of the side openings 19 through which the associated stopper rods 14 move during the movement of the lock member 9 between the unlocked and locked positions has been described as defined at the stepped shoulder in each side wall of at least the upper casing half 1a. Specifically, as best shown in FIGS. 7 and 10, each of the side wall of the upper casing 1a is, when viewed from top as shown in FIG. 7, constituted by an inner side wall segment 23 adjacent the front window 4 and an outer side wall segment 24 extending parallel to, but offset laterally relative to the inner side wall segment 23, and a gate wall g lying parallel to any one of the inner and outer side wall segments 23 and 24 and connecting the both together. The gate wall g has the side openings 19 defined therein for the passage of the corresponding stopper rod 14 therethrough.

The position of the gate wall g in each of the side walls of the upper casing 1a is so chosen that, so long as the tape cartridge is not in use with the lock member 9 held in the lock position, the free end of each stopper rod 14 is situated within the respective side opening 19. In this case, the extent to which the inner and outer side wall segments 23 and 24 are laterally offset relative to each other is so chosen as to correspond to the thickness of each stopper rod 14 or, alternatively, each side opening 19 may be so chosen as to have a width corresponding to the thickness of the associated stopper rod 14, thereby to avoid any lateral rattling motion of the stopper rod 14 within the associated side opening 19.

Each side opening 19 may be of a generally closed rectangular configuration or, alternatively, it may be of a generally U-shaped configuration opening downwardly towards the corresponding side wall of the lower casing 1b. In the illustrated embodiments, the side opening 19 is of the generally U-shaped configuration opening downwardly towards the corresponding side wall of the lower casing 1b and, therefore, in the event that the free ends of the stopper rods 14 abruptly and vigorously abut against the free end faces of the hinge arms 6b of the front cover 6, a bending moment indicated by M in FIG. 6 acts to bend the free ends of the hinge arms 6b downwardly towards the lower casing half 1b. To avoid this possibility, a bench piece 26 is formed on an upper edge of each side wall of the lower casing 1b at a location immediately below the associated side opening 19 to support the associated stopper rod 14 from below thereby to avoid any possible bending of the support rod 14.

It is to be noted that, although in any one of the foregoing embodiments of the present invention, the stopper rods 14 have been described as employed for each side of the tape cartridge, only one stopper rod 14 may be employed for either side of the tape cartridge. It is also to be noted that an undesirable movement of the lock member 9 towards the unlock position may also be suppressed even when at least a similar bench piece is formed on the associated operating rib 16 integral with the front cover 6.

Figure 11:
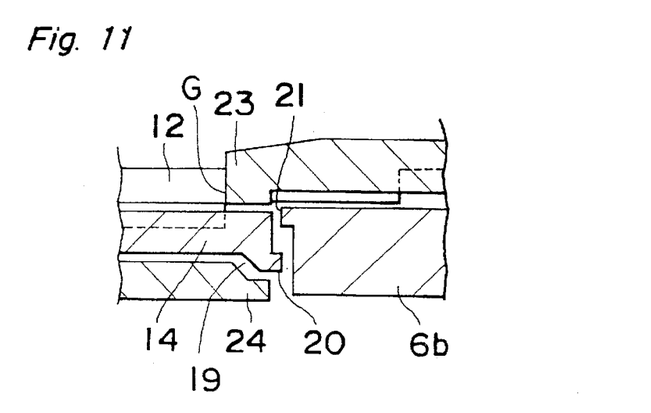
FIG. 11 is a view similar to FIG. 7, showing the tape cartridge according to the second preferred embodiment of the present invention.
Figure 12:
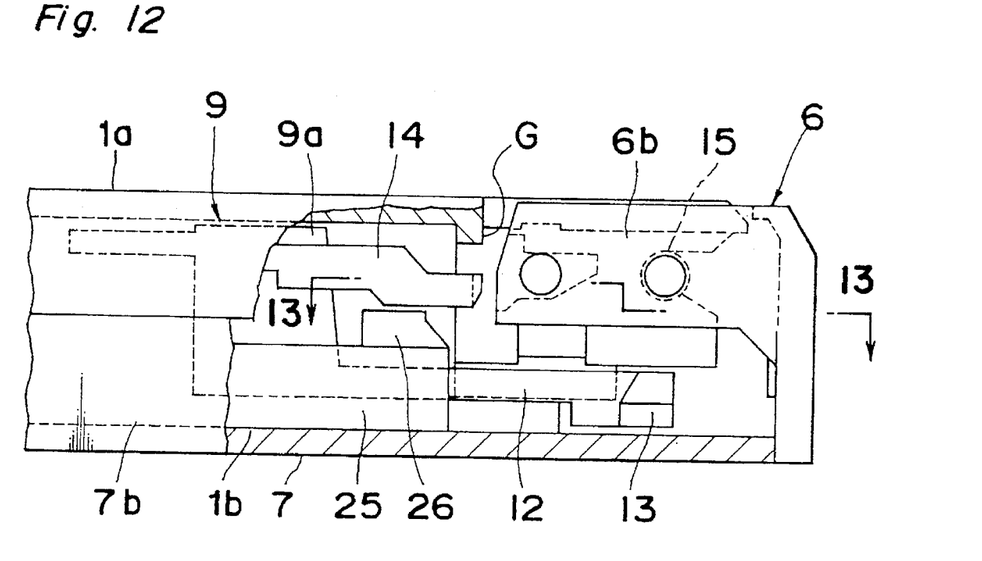
FIG. 12 is a fragmentary side view, with a portion cut away, of the tape cartridge according to a third preferred embodiment of the present invention.
Figure 13:
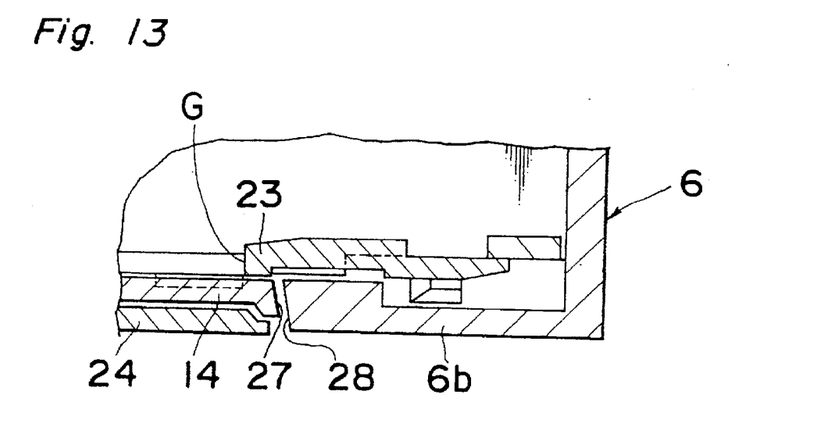
FIG. 13 is a cross-sectional view taken along the line B—B in FIG. 12.

While respective mating faces of the first and second lateral protuberances 20 and 21 forming the lateral displacement suppressing means 22, which confront with each other in a direction transverse to the associated side wall of the casing 1, are inclined so as to extend parallel to each other, as best shown in FIG. 7, the mating faces of the first and second lateral protuberances 20 and 21 may be right-angled relative to the associated stopper rod 14 and the associated hinge arm 6b as best shown in FIG. 11. Alternatively, as shown in FIGS. 12 and 13, the lateral displacement suppressing means 22 may be constituted by a first inclined end face 27 defined in the free end face of the stopper rod 14 and a second inclined end face 28 defined in the free end face of the hinge arm 6b and extending parallel to the first inclined end face 27.

Figure 14:
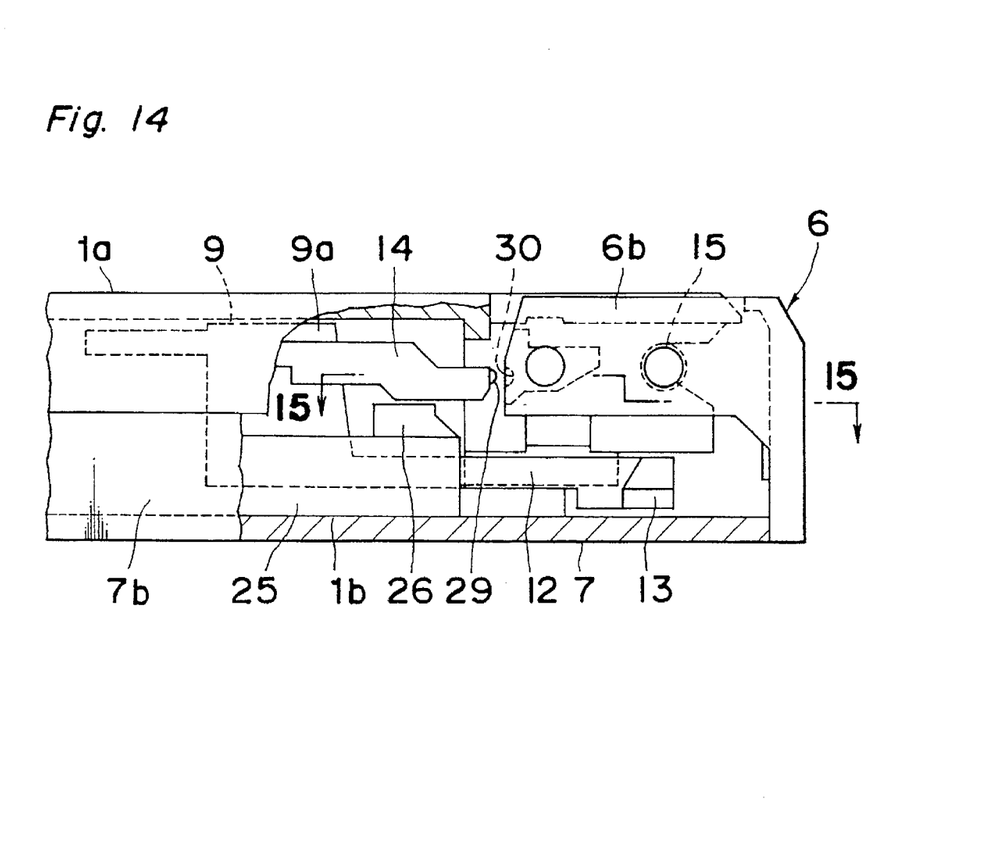
FIG. 14 is a fragmentary side view, with a portion cut away, of the tape cartridge according to a fourth preferred embodiment of the present invention.
Figure 15:
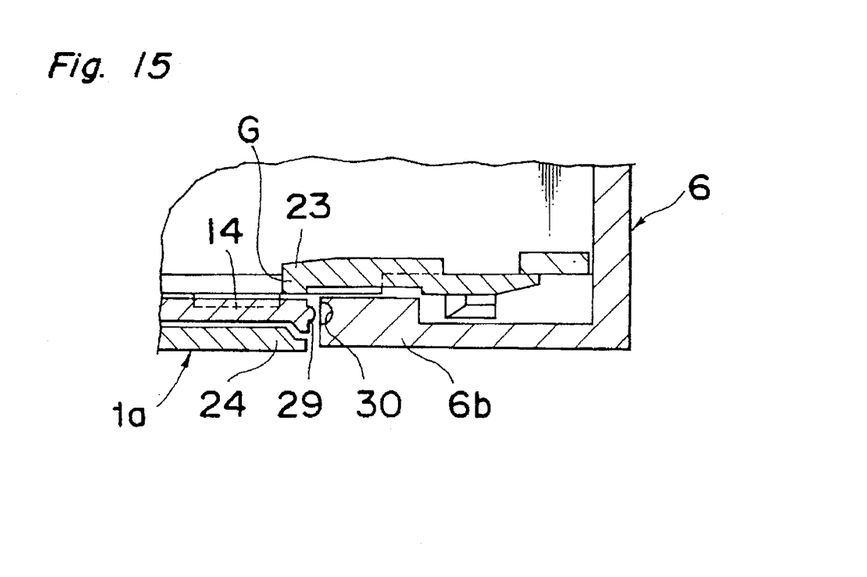
FIG. 15 is a cross-sectional view taken along the line C—C in FIG. 14.

Again alternatively, as best shown in FIGS. 14 and 15, the lateral displacement suppressing means 22 may be constituted by a semi-spherical or conical protuberance 29 formed on the free end face of one of the stopper rod 14 and the hinge arm 6b so as to protrude towards the associated hinge arm 6b or the associated stopper rod 14, and a pocket 30 formed on the free end face of the other of the stopper rod 14 and the free end face of the hinge arm 6b and having a shape complemental to the shape of the semi-spherical or conical protuberance 29. The lateral displacement suppressing means 22 constituted by the shaped protuberance 29 and the complementally shaped pocket 30, as shown in FIGS. 16 and 17, is particularly advantageous in that, even though the free end of the stopper rod 14 is substantially displaced laterally relative to the free end of the associated hinge arm 6b at the moment the stopper rod 14 is brought into abutment with the associated hinge arm 6b, the shaped protuberance 29 is received within the complementally shaped pocket 30 thereby to assuredly avoid any possible plunging of the stopper rod 14 into the gap between the associated hinge arm 6b and the adjoining side wall (inner side wall segment 23) of the upper casing half 1b.

Figure 16:
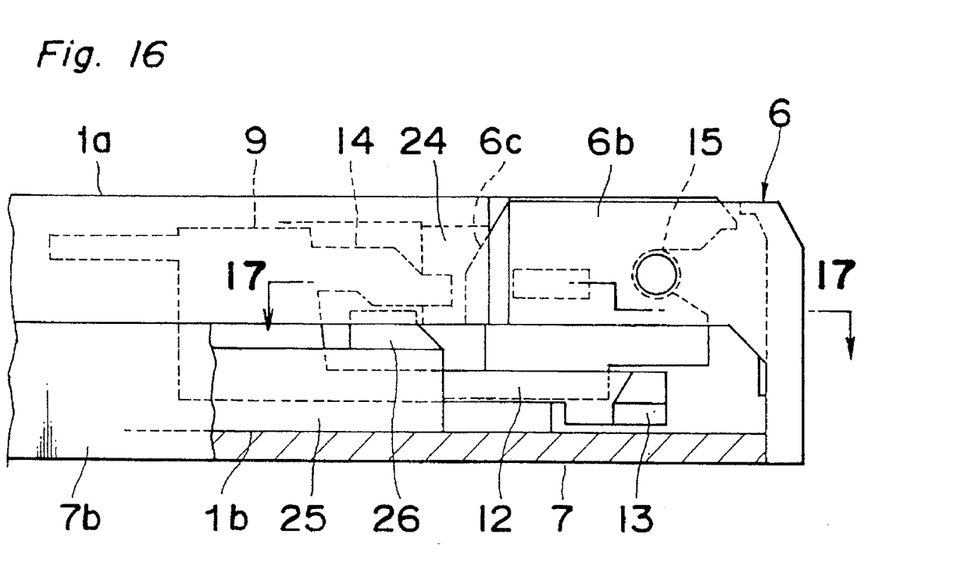
FIG. 16 is a fragmentary side view, with a portion cut away, of the tape cartridge according to a fifth preferred embodiment of the present invention.
Figure 17:
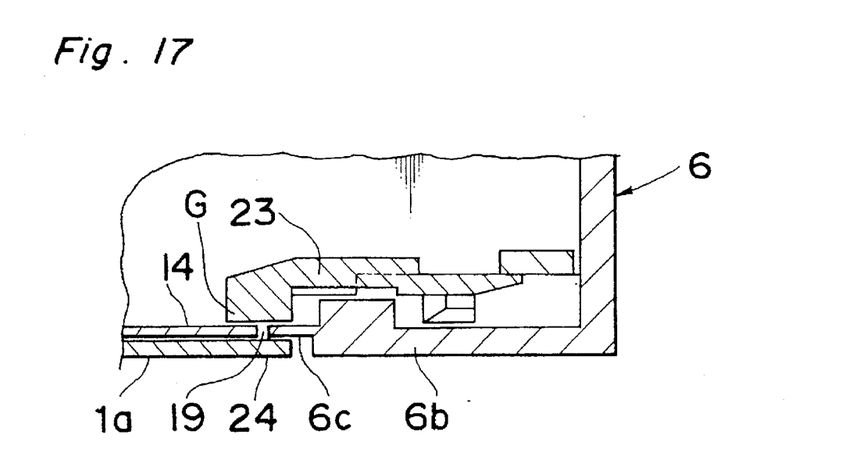
FIG. 17 is a cross-sectional view taken along the line D—D in FIG. 16.

In an embodiment shown in FIGS. 16 and 17, the free end of the hinge arm 6b integral with the front cover 6 is formed with a thin-walled extension 6c protruding outwardly therefrom towards the associated stopper rod 14 so that, so long as the front cover 6 is held in the closed position, the extension 6c is received within the side opening 19 together with the free end of the associated stopper rod 14. According to the embodiment of the lateral displacement suppressing means 22, shown in FIGS. 16 and 17, so long as the tape cassette is not in use with the front cover 6 consequently held in the closed position, any undesirable lateral displacement of both of the respective free ends of the stopper rod 14 and the corresponding hinge arm 6b can advantageously minimized or substantially eliminated since both of the free end of the stopper rod 14 and the extension 6c of the corresponding hinge arm 6b are enclosed within the associated side opening 19.

Figure 18:
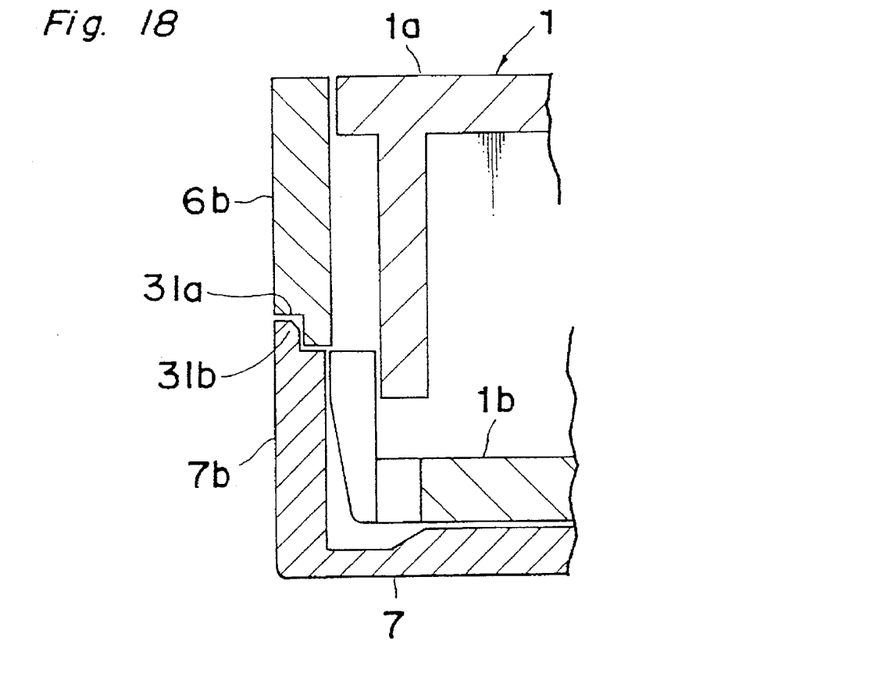
FIG. 18 is a fragmentary side sectional view of the tape cartridge, showing a modified form of the front cover and a slider.

FIG. 18 illustrates a modified form of a deformation preventing means for preventing any possible deformation of each of the hinge arms 6b of the front cover 6 this deformation preventing means exhibits its function and effect when the tape cassette is not in use, that is, when the front cover 6 is held in the closed position and the slider 7 is held in the projected position. As shown therein, a lower face of the respective hinge arm 6b is formed with a generally L-sectioned groove 31a while an upper face of the side wall 7b of the slider 7 is formed with a mating rib 31b engageable in said L-sectioned groove 31a, thereby to avoid any possible lateral deformation of one of the hinge arm 6b and the side wall 7b relative to the other of the hinge arm 6b and the side wall 7b.

Figure 19:
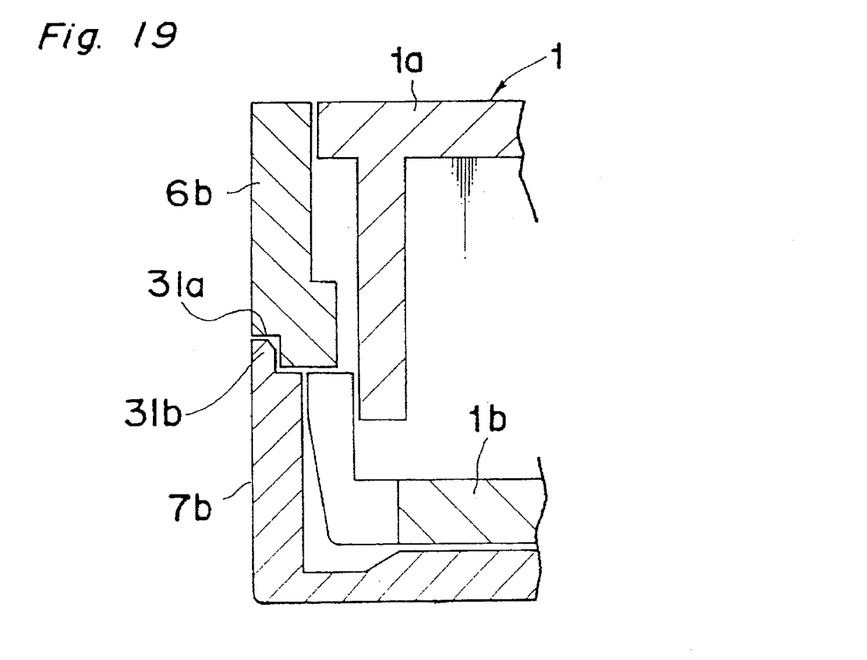
FIG. 19 is a fragmentary side sectional view of the tape cartridge, showing another modified form of the front cover and the slider.

The effect to avoid the possible lateral deformation of one of the hinge arm 6b and the side wall 7b relative to the other of the hinge arm 6b and the side wall 7b can be advantageously enhanced if, as shown in FIG. 19, that portion of the hinge arm 6b where the L-shaped groove 31a is formed and confronts the rib 31b is thick-walled to have an increased thickness.

Thus, according to the present invention, the stopper rods 14 protruding from the side plates 9a of the lock member 9 are designed to receive the rear end faces of the respective hinge arms 6b integral with the front cover 4 so as to avoid an arbitrary movement of the lock member 9 towards the unlock position when the front cover 4 is in the closed position. Accordingly, when the tape cartridge is inadvertently dropped onto the ground surface with a drastic impact consequently acting thereon, the lock pawls 11 will not disengage from the associated toothed lock wheels 8 and, therefore, any possible loosening of the length of magnetic tape can advantageously be avoided. This in turn substantially eliminates the possibility of the digital audio tape player malfunctioning as a result of entanglement of the loosened length of magnetic tape around component parts of the player and/or by any other reason.

The provision of the lateral displacement suppressing means 22 defined in the free end faces of the stopper rods 14 and the mating free end faces of the hinge arms 6b integral with the front cover 4 makes it possible to avoid any possible lateral displacement of the stopper rods 14 relative to the associated hinge arms 6b which would otherwise result in an undesirable plunge of the stopper rods 14 into gaps between the hinge arms 9b and the side walls of the tape cartridge and/or an undesirable lateral deformation of the hinge arms 6b.

The use of each side wall of the tape cartridge which is comprised of the inner and outer wall segments 23 and 24 with the respective side opening 19 defined therebetween ensures any possible lateral displacement of one or both of the hinge arms 6b and the stopper rods 14 inwardly or outwardly with respect to the tape cartridge.

Also, according to the present invention, the possible lateral deformation of one of the hinge arm 6b and the side wall 7b relative to the other of the hinge arm 6b and the side wall 7b can be substantially eliminated by the use of the L-shaped groove 31a, formed in one of the hinge arm 6b and the side wall 7b, and the rib 31b formed in the other of the hinge arm 6b and the side wall 7b, thereby to ensure an constant alignment of the respective stopper rod 14 with the associated hinge arm 6b which is necessary to assuredly avoid the undesirable movement of the lock member 9 towards the unlock position.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A tape cartridge which comprises:

a generally rectangular box-like casing including rectangular top and bottom walls, a pair of side walls and a rear wall, all assembled together to represent a generally rectangular flat boxlike configuration with a tape chamber defined therein, said casing having a front opening opposite to said rear wall;

a front cover hinge supported having a pair of hinged arms pivotally coupled to said respective side walls for pivotal movement between opened and closed positions, said front opening being opened and closed when said front cover is in the opened and closed positions, respectively;

first and second reels rotatably housed within said tape chamber, with opposite ends of a length of magnetic tape being secured to said first and second reels, respectively, each of said reels having a toothed lock wheel rotatable together therewith;

a hub lock mechanism housed within said tape chamber and including a generally elongated lock member movable between locked and unlocked positions in a direction transverse to said front cover, and a spring element for biasing said lock member towards said locked position, said lock member including a bridge plate, lateral side plates, traction arms and lock pawls engageable with said toothed lock wheels to lock said respective reels when said lock member is in said locked position, said traction arms protruding from said lateral side plates of said bridge plate of said lock member in a direction perpendicular to said bridge plate, said traction arms being operatively associated with said hinged arms such that, as said front cover is pivoted from a closed position towards an opened position, said lock member is pulled from a lock position towards an unlocked position against said spring element; and at least one stopper rod attached to said lock member so as to extend towards said front opening in alignment with a corresponding one of said hinged arms, said stopper rod having a free end spaced a given distance from said corresponding hinged arm when said front cover is in a closed position, such that any movement of said lock member over said given distance while said front cover is in said closed position is prevented from causing the disengagement of said lock member as a result of said free end of said at least one stopper rod engaging said corresponding hinged arm.

2. The tape cartridge as in claim 1, wherein said at least one stopper rod is rigidly connected to at least one opposite end of said lock member so as to extend in a plane offset laterally from that plane in which said traction arm extends.

3. The tape cartridge as in claim 1, wherein said at least one stopper rod comprises a first end fixed perpendicular to a lateral surface of a corresponding traction arm and a second end forming a right angle with said first end and extending towards said front opening of said cartridge in alignment with a corresponding hinged arm.

4. The tape cartridge as in claim 3, wherein at least one stopper rod is attached to a lateral surface of said corresponding traction arm so as to extend upward from an intermediate portion of said traction arm.

5. The tape cartridge as in claim 1 or 3, further including a lateral displacement suppressing means defined in part in said free end of said at least one stopper rod and in part in said free end of said corresponding hinge arm for avoiding deformation of said at least one stopper rod inward of said casing.

6. The tape cartridge as in claim 5, wherein said casing also includes an inner side wall segment for restricting an inward displacement of said at least one stopper rod and each hinged arm when said front cover is in said closed position.

7. The tape cartridge as in claim 1 or 3, wherein said casing also includes an outer side wall segment for restricting an outer displacement of said at least one stopper rod and each hinged arm when said front cover is in said closed position.

8. The tape cartridge as in claim 1 or 3, further comprising a generally U-sectioned slider forming a front area of said bottom wall and supported for movement in a direction perpendicular to said front cover for selectively opening and closing a bottom region of said front opening, said slider having upright side wall elements aligned with the respective hinged arms integral with said front cover, each of said side wall elements having a first engagement defined therein while each of said hinged arms has a second engagement defined therein for engagement with said first engagement to prevent said hinged arms from being outwardly deformed.

9. The tape cartridge as in claim 5, wherein said lateral displacement suppressing means comprises a protuberance protruding outwardly from one of the free ends of said stopper rod and said corresponding hinge arm, and a pocket defined in the other of said free ends of said stopper rod and corresponding hinge arm for receiving said protuberance therein.

10. The tape cartridge as in claim 5, further including a lateral displacement suppressing means defined in part in said free end of said at least one stopper rod and in part in said free end of said corresponding hinge arm for avoiding deformation of said at least one stopper rod inward of said casing.

11. The tape cartridge as in claim 10, wherein said casing also includes an inner side wall segment for restricting an inward displacement of said at least one stopper rod and each hinged arm when said front cover is in said closed position.

12. The tape cartridge as in claim 10, wherein said lateral displacement suppressing means comprises a protuberance protruding outwardly from one of the free ends of said stopper rod and said corresponding hinge arm, and a pocket defined in the other of said free ends of said stopper rod and corresponding hinge arm for receiving said protuberance therein.

13. The tape cartridge as in claim 3, wherein said casing also includes an outer side wall segment for restricting an outer displacement of said at least one stopper rod and each hinged arm when said front cover is in said closed position.

14. The tape cartridge as in claim 3, further comprising a generally U-sectioned slider forming a front area of said bottom wall and supported for movement in a direction perpendicular to said front cover for selectively opening and closing a bottom region of said front opening, said slider having upright side wall elements aligned with the respective hinged arms integral with said front cover, each of said side wall elements having a first engagement defined therein while each of said hinged arms has a second engagement defined therein for engagement with said first engagement to prevent said hinged arms from being outwardly deformed.

* * * * *